United States Patent
Udupa et al.

(10) Patent No.: US 11,995,830 B2
(45) Date of Patent: May 28, 2024

(54) DEEP LEARNING ARCHITECTURE FOR ANALYZING MEDICAL IMAGES FOR BODY REGION RECOGNITION AND DELINEATION

(71) Applicant: The Trustees of the University of Pennsylvania, Philadelphia, PA (US)

(72) Inventors: Jayaram K. Udupa, Philadelphia, PA (US); Vibhu Agrawal, Philadelphia, PA (US); Yubing Tong, Springfield, PA (US); Drew A. Torigian, Philadelphia, PA (US)

(73) Assignee: The Trustees of the University of Pennsylvania, Philadelphia, PA (US)

( * ) Notice: Subject to any disclaimer, the term of this patent is extended or adjusted under 35 U.S.C. 154(b) by 263 days.

(21) Appl. No.: 17/172,741

(22) Filed: Feb. 10, 2021

(65) Prior Publication Data
US 2022/0254026 A1    Aug. 11, 2022

(51) Int. Cl.
| | |
|---|---|
| *G06T 7/00* | (2017.01) |
| *G06F 18/2413* | (2023.01) |
| *G06N 3/04* | (2023.01) |
| *G06N 3/08* | (2023.01) |
| *G06T 7/11* | (2017.01) |

(52) U.S. Cl.
CPC ........ *G06T 7/0016* (2013.01); *G06F 18/2413* (2023.01); *G06N 3/04* (2013.01); *G06N 3/08* (2013.01); *G06T 7/11* (2017.01); *G06T 2207/10081* (2013.01); *G06T 2207/10088* (2013.01); *G06T 2207/10104* (2013.01); *G06T 2207/10108* (2013.01); *G06T 2207/20081* (2013.01); *G06T 2207/20084* (2013.01)

(58) Field of Classification Search
CPC ................. G06T 7/0016; G06T 7/11; G06T 2207/10081; G06T 2207/10088; G06T 2207/10104; G06T 2207/10108; G06T 2207/20081; G06T 2207/20084; G06T 2207/10072; G06T 2207/30016; G06T 2207/30061; G06K 9/627; G06N 3/04; G06N 3/08; G06V 10/82
See application file for complete search history.

(56) References Cited

U.S. PATENT DOCUMENTS

| | | | | |
|---|---|---|---|---|
| 2016/0300351 | A1* | 10/2016 | Gazit | G06T 5/009 |
| 2019/0318497 | A1* | 10/2019 | Zhao | A61B 6/0407 |
| 2020/0226422 | A1* | 7/2020 | Li | G06K 9/6228 |

(Continued)

OTHER PUBLICATIONS

Bai et al., Automatic thoracic body region localization. In Medical Imaging 2017: Computer-Aided Diagnosis, International Society for Optics and Photonics, vol. 10134, 2017, p. 101343X.

(Continued)

*Primary Examiner* — Ping Y Hsieh
(74) *Attorney, Agent, or Firm* — BakerHostetler

(57) ABSTRACT

Provided are systems and methods for analyzing medical images to localize body regions using deep learning techniques. A combination of convolutional neural network (CNN) and a recurrent neural network (RNN) can be applied to medical images, identifying axial slices of a body region. In accordance with embodiments, boundaries, e.g., superior and inferior boundaries of various body regions in computed tomography images can be automatically demarcated.

25 Claims, 9 Drawing Sheets

(56) References Cited

U.S. PATENT DOCUMENTS

| | | | | |
|---|---|---|---|---|
| 2020/0380696 | A1* | 12/2020 | Feng | G06T 7/0012 |
| 2021/0151170 | A1* | 5/2021 | Shi | G06V 10/82 |
| 2021/0397966 | A1* | 12/2021 | Sun | G06T 7/10 |

OTHER PUBLICATIONS

Bai et al., Body region localization in whole-body low-dose CT images of PET/CT scans using virtual landmarks. Medical physics, 46(3), 2019, pp. 1286-1299.

Canziani et al., An analysis of deep neural network models for practical applications, 2016, arXiv preprint arXiv:1605.07678.

Hochreiter et al., Long short-term memory. Neural computation, 9(8), 1997, pp. 1735-1780.

Hussein et al., Automatic segmentation and quantification of white and brown adipose tissues from PET/CT scans, IEEE transactions on medical imaging, 36(3), 2017, pp. 734-744.

Krizhevsky et al., Imagenet classification with deep convolutional neural networks. In Advances in neural information processing systems, 2012, pp. 1097-1105.

Lee et al., Recognizing abdominal organs in CT images using contextual neural network and fuzzy rules. In Proceedings of the 22nd Annual International Conference of the IEEE Engineering in Medicine and Biology Society, Cat. No. 00CH37143, vol. 3, 2000, pp. 1745-1748.

Lipton et al., A critical review of recurrent neural networks for sequence learning, 2015, arXiv preprint arXiv:1506.00019.

Simonyan et al., Very deep convolutional networks for large-scale image recognition, 2014, arXiv preprint arXiv:1409.1556.

Szegedy et al., Going deeper with convolutions. In Proceedings of the IEEE conference on computer vision and pattern recognition, 2015, pp. 1-9.

Udupa et al., Body-wide hierarchical fuzzy modeling, recognition, and delineation of anatomy in medical images. Medical image analysis, 18(5), 2014, pp. 752-771.

Wang et al., A two-step convolutional neural network based computer-aided detection scheme for automatically segmenting adipose tissue volume depicting on CT images. Computer methods and programs in biomedicine, 144, 2017, pp. 97-104.

Wang et al., Automatic anatomy recognition in whole-body PET/CT images, Medical physics, 43(1), 2016, pp. 613-629.

* cited by examiner

The GoogLeNet architecture

An inception block with dimension reductions[8]

Network architecture of the recurrent neural network used

Architecture of BRR-Net

Sample true and predicted slices for a good case for each class (first two rows; nS <=1) and a poor case for each class (bottom two rows; nS>1) for low-dose CT images Sample true and predicted slices for a good case for each class (first two rows; nS <=1) and a poor case for each class (bottom two rows; nS>1) for diagnostic CT images

DEEP LEARNING ARCHITECTURE FOR ANALYZING MEDICAL IMAGES FOR BODY REGION RECOGNITION AND DELINEATION

BACKGROUND

In clinical imaging practice, body region definitions are not followed when patients are scanned, as the scanned images of each patient usually cover different extents of anatomy, even if the scans adequately represent the body region of focus. In situations where body regions are prescribed, accurate scans and representations can be difficult to implement.

An important step towards effective implementation of quantitative radiology is the recognition and delineation of objects in the human body, such as organs, tissue regions, or other well-defined body regions. In other words, proper and precise identification of body regions and objects is essential for accurate imaging analyses. Standardizing definitions for objects and body regions would be helpful in order to develop generalizable body-wide imaging methods and to recognize and identify specific body regions and objects of interest. In addition, standard body region and object definitions can be particularly beneficial to standardize clinical operations, and to use the quantitative information meaningfully. With this ideology in mind, the standardization of body-region boundaries is an important task in quantitative radiology, and especially important for recognizing and delineating objects that span body regions. The thoracic spinal cord region is one example where the boundaries clearly depend on the definition of the thoracic body region.

Very few methods for analyzing medical images and standardizing region boundaries exist and they require manual location of body regions, e.g., by specifying the superior and inferior axial slices for each region. However, such techniques are time-consuming, require trained technicians to identify body region locations, and are prone to inconsistencies and errors due to the subjective nature of manual identification. In addition, processing times of medical images are limited by number and speed of the image analysts, and their manual processing times. As such, in a production-mode operation, there is a need to address the limitations of current, image analysis methods and manual location of body regions.

SUMMARY

The present disclosure describes systems and methods to analyze medical images using deep learning techniques, and to automatically demarcate the superior and inferior boundaries for neck, thorax, abdomen, and pelvis body regions in computed tomography (CT) images. The present disclosure comprises a two-step approach for automatically locating the body region boundaries precisely and accurately. The automation of such tasks as disclosed herein is a vital step in minimizing the need of a radiological expert every time a framework like Automatic Anatomy Recognition (AAR) is used. This work also helps in taking a step forward in the acceptance of standardized body-region boundaries universally by providing an easy-to-use implementation for locating these boundaries in a volumetric image, the accuracy of which is remarkably close to human-level performance. The proposed methodology works regardless of whether the input volumetric CT image spans the entire body or only a portion of the body. Thus, the disclosed techniques address the challenges above and further enables full and accurate automation of the fundamental step of body region recognition and enables precise definitions of body regions and objects.

In accordance with embodiments of the present disclosure, four different body regions can be identified in images using the disclosed techniques. For an image I, the following body regions can be defined: the neck, the thorax, the abdomen, and the pelvis, and denote their superior and inferior axial boundary slices by NS(I), NI(I), TS(I), TI(I), AS(I), AI(I), PS(I), and PI(I). Of these, AI(I) and PS(I) are the same axial plane locations, and so the problem statement reduces to demarcating 7 body region boundaries. The described method comprises a multi-step approach. In the first step, a convolutional neural network (CNN) is trained to classify each axial slice in an axial CT image stack into one of nine categories: the seven body region boundaries, legs (e.g., defined as all axial slices inferior to PI(I)), and the none-of-the-above (NOTA) category. This CNN uses a multi-channel approach to exploit the inter-slice contrast, providing the neural network with additional visual context at the body region boundaries. In the second step, to improve the predictions for body region boundaries that are defined by features that do not exhibit a high contrast relative to their neighboring voxels, a recurrent neural network (RNN) is trained on features extracted using the CNN, limited to a flexible window about the predictions from the CNN.

The described systems and methods are tested by using low-dose unenhanced CT images from 442 PET/CT scans. In embodiments the CT images in PET/CT acquisitions can require less radiation than diagnostic CT scans, and have different acquisition parameters such as x-ray tube voltage, x-ray tube current, thus resulting in a lower radiation dose. In other embodiments, CT scans that do not use contrast material to enhance the images can be considered "low-dose unenhanced" CT scans and can be of lower image quality than the diagnostic CT scans. These data sets are divided into training and testing sets with a ratio of 70:30. Using only the CNN, overall mean localization error for the seven locations NS(I), NI(I), TS(I), TI(I), AS(I), AI(I), and PI(I) expressed as number of slices (nS) is 0.61, 1.05, 0.31, 1.85, 0.57, 3.42, and 0.50, respectively. Using the RNN to improve the accuracy of AI(I) and TI(I), the results were nS: 0.61, 1.05, 0.31, 1.35, 0.57, 2.83, and 0.50, respectively.

Standardized body region definitions are a pre-requisite for effective implementation of quantitative radiology, but the literature is severely lacking in the precise definition and identification of body regions. The method presented in this paper significantly outperforms those presented in previously published works by us by a large margin, where the results and their variations from ground truth are comparable to those obtained via manual labelling by experts.

BRIEF DESCRIPTION OF THE DRAWINGS

In the drawings, which are not necessarily drawn to scale, like numerals can describe similar components in different views. Like numerals having different letter suffixes can represent different instances of similar components. The drawings illustrate generally, by way of example, but not by way of limitation, various aspects discussed in the present document. In the drawings:

FIG. 1A is a slice showing the superior-most aspect of the mandible.

FIG. 1B is a slice showing the apex of the right lung.

FIG. 1C is a slice showing the level of bifurcation of the superior vena cava into left and right brachiocephalic veins.

FIG. 1D is a slice showing the superior-most aspect of the liver.

FIG. 1E is a slice showing the base of the lungs.

FIG. 1F is a slice showing the level of bifurcation of the abdominal aorta into common iliac arteries.

FIG. 1G is a slice showing the inferior-most aspect of the ischial tuberosities of the pelvis.

DETAILED DESCRIPTION OF ILLUSTRATIVE EMBODIMENTS

Figure 1A:
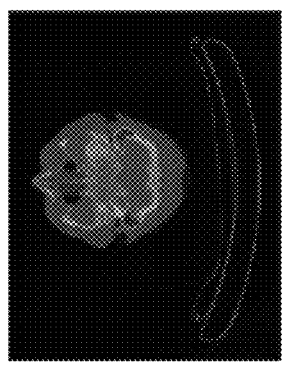
FIGS. 1A-1G provide examples of medical images usable in embodiments of the present disclosure, including distinguishing features used to define the body region boundaries indicated in the medical image.

The present disclosure can be understood more readily by reference to the following detailed description of desired embodiments and the examples included therein.

Unless otherwise defined, all technical and scientific terms used herein have the same meaning as commonly understood by one of ordinary skill in the art. In case of conflict, the present document, including definitions, will control. Preferred methods and materials are described below, although methods and materials similar or equivalent to those described herein can be used in practice or testing. All publications, patent applications, patents and other references mentioned herein are incorporated by reference in their entirety. The materials, methods, and examples disclosed herein are illustrative only and not intended to be limiting.

The singular forms "a," "an," and "the" include plural referents unless the context clearly dictates otherwise.

As used in the specification and in the claims, the term "comprising" can include the embodiments "consisting of" and "consisting essentially of." The terms "comprise(s)," "include(s)," "having," "has," "can," "contain(s)," and variants thereof, as used herein, are intended to be open-ended transitional phrases, terms, or words that require the presence of the named ingredients/steps and permit the presence of other ingredients/steps. However, such description should be construed as also describing compositions or processes as "consisting of" and "consisting essentially of" the enumerated ingredients/steps, which allows the presence of only the named ingredients/steps, along with any impurities that might result therefrom, and excludes other ingredients/steps.

As used herein, the terms "about" and "at or about" mean that the amount or value in question can be the value designated some other value approximately or about the same. It is generally understood, as used herein, that it is the nominal value indicated ±10% variation unless otherwise indicated or inferred. The term is intended to convey that similar values promote equivalent results or effects recited in the claims. That is, it is understood that amounts, sizes, formulations, parameters, and other quantities and characteristics are not and need not be exact, but can be approximate and/or larger or smaller, as desired, reflecting tolerances, conversion factors, rounding off, measurement error and the like, and other factors known to those of skill in the art. In general, an amount, size, formulation, parameter or other quantity or characteristic is "about" or "approximate" whether or not expressly stated to be such. It is understood that where "about" is used before a quantitative value, the parameter also includes the specific quantitative value itself, unless specifically stated otherwise.

Unless indicated to the contrary, the numerical values should be understood to include numerical values which are the same when reduced to the same number of significant figures and numerical values which differ from the stated value by less than the experimental error of conventional measurement technique of the type described in the present application to determine the value.

All ranges disclosed herein are inclusive of the recited endpoint and independently of the endpoints. The endpoints of the ranges and any values disclosed herein are not limited to the precise range or value; they are sufficiently imprecise to include values approximating these ranges and/or values.

As used herein, approximating language can be applied to modify any quantitative representation that can vary without resulting in a change in the basic function to which it is related. Accordingly, a value modified by a term or terms, such as "about" and "substantially," cannot be limited to the precise value specified, in some cases. In at least some instances, the approximating language can correspond to the precision of an instrument for measuring the value. The modifier "about" should also be considered as disclosing the range defined by the absolute values of the two endpoints. For example, the expression "from about 2 to about 4" also discloses the range "from 2 to 4." The term "about" can refer to plus or minus 10% of the indicated number. For example, "about 10%" can indicate a range of 9% to 11%, and "about 1" can mean from 0.9-1.1. Other meanings of "about" can be apparent from the context, such as rounding off, so, for example "about 1" can also mean from 0.5 to 1.4. Further, the term "comprising" should be understood as having its open-ended meaning of "including," but the term also includes the closed meaning of the term "consisting." For example, a composition that comprises components A and B can be a composition that includes A, B, and other components, but can also be a composition made of A and B only. Any documents cited herein are incorporated by reference in their entireties for any and all purposes.

The automatic anatomy recognition (AAR) methodology is based on the fundamental premise of first defining body regions and all objects in each body region computationally precisely, then creating models of the body region with all its objects, and subsequently performing object recognition, delineation, and analysis as required by various applications served by AAR. In clinical imaging practice, when patients are scanned, body region definitions are not followed, as such the scanned images of each patient usually cover different extent of anatomy although they adequately represent the body region of focus. In the past, body region recognition (BRR)—meaning finding the axial slices forming the precise superior and inferior boundaries of each body region (e.g., head & neck (H&N), thorax, abdomen, and pelvis), and subsequently trimming the given patient image to contain only and precisely the slices between these boundaries—was performed manually within all AAR methods and its applications. Additional embodiments include automatic methods based on deep learning (DL) networks to perform tasks for all four body regions in the extended body torso. It is important to note that none of the published methods employ precise definitions of body regions and objects, as such they have not been able to achieve what AAR has accomplished in varied medical image analysis tasks. This is a unique strength of the AAR methodology and its applications. Various embodiments discussed herein further fortify this aspect by fully and accurately automating this fundamental step.

The method is a three-step approach. In the first step, a DL convolutional neural network (CNN) appropriate for the task of finding body region boundary slices in a given patient scan is designed. To improve the predictions for body region boundaries that are defined by subtle features or features that do not exhibit a high contrast in the image or features that have low conspicuity, a recurrent neural network (RNN) trained on features extracted using the CNN, limited to a flexible window about the predictions from the CNN, forms the second component the DL network. The CNN along with the RNN for the extracted features together form a two-component network which can be referred to herein as "BRR-Net". It should be understood that an implementation of BRR-Net can comprise any combination of the features disclosed herein. In the second step, the entire network is trained with a sufficiently large number of patient studies to yield optimal performance. The network recognizes (e.g., classifies, determines) each slice in any given patient study into one of nine categories—the seven body region boundaries, legs (defined as all axial slices inferior to PI(I)), and the none-of-the-above (NOTA) category. BRR-Net can handle studies covering the whole extended body torso (which includes all four 4 body regions), or just each body region alone, or any combination of the body regions. It uses a multi-channel approach to exploit the inter-slice contrast, providing the neural network with additional image appearance context at the body region boundaries.

It will be appreciated that body regions can comprise one of the four main body regions discussed herein: the neck, thorax, abdomen, and pelvis. In accordance with embodiments discussed herein body regions can comprise an area or region of interest containing one or more organs, e.g., internal organs such as the brain, or internal structures requiring medical imaging, e.g., CT, positron emission tomography (PET) scans, single photon emission tomography (SPECT) scans, magnetic resonance imaging (MRI), etc. Body regions, as discussed herein, may also refer to areas typically imaged for medical purposes, e.g., to analyze internal bones, organs, or other structures.

BRR-Net has been tested by using low-dose unenhanced CT images from 442 patient PET/CT scans which are divided into training and testing sets with the ratio of 70:30. Using only the CNN, overall mean localization errors for the eight locations (superior and inferior boundaries of H&N, thorax abdomen, and pelvis in that order) expressed as number of slices of difference with respect to manually established ground truth locations were: 0.61, 1.05, 0.31, 1.85, 0.57, 3.42, 3.42, and 0.50, respectively. Using the RNN to improve the accuracy, the results were: 0.61, 1.05, 0.31, 1.35, 0.57, 2.83, 2.83, and 0.50, respectively.

Standardized body region definitions are a pre-requisite for effective implementation of quantitative radiology, but the literature is severely lacking in the precise identification of body regions. The systems and methods presented herein significantly outperform those presented in previously published works by a large margin, where the results and their variations from ground truth are comparable to those obtained via manual labelling by experts. Compared to earlier approaches that utilized virtual landmarks, BRR-Net has two major advantages: (i) It does not require segmenting, albeit roughly, one or more reference objects in the given image, as required by the earlier method; and (ii) It achieves an accuracy level much superior to the previous methods and becomes almost indistinguishable from manual methods of expert identification of the boundary slices.

The disclosed techniques also provide improvements over other conventional approaches. Bai et al.[1] attempts to tackle this problem by using a system of virtual landmarks employing principal component analysis and recursive subdivision of objects, and subsequently using a neural network (but not a deep neural network) for mapping the virtual landmarks to boundary locations. Hussein et al.[4] propose a one-shot deep learning solution for automatically localizing the boundaries for the abdominal and thoracic regions by locating the superior and inferior boundaries of the abdomen and thorax, respectively, as a step in segmenting and quantifying intra-thoracic adipose tissue in PET/CT images. In a more abstract sense of localization, Bi et al.[5] use an adaptive thresholding model to partition a PET/CT scan into 3 sections: above lungs, lungs, and below lungs.

Operating on the slice level, Lee et al.[13] segment each slice in a volumetric CT image into disconnected regions using a neural network and use the common information between adjacent slices and fuzzy rules based on spatial relationships for recognizing various organs in each slice. Yunzhi et al.[12] classify slices in volumetric CT images as either belonging to the abdomen area or not belonging to the abdomen area using a convolutional neural network (CNN). This approach treats the problem as a binary classification problem considering each slice independently and using a one-dimensional median filter to smooth the results to remove spatial inconsistencies.

Outline of the Approach

As disclosed further herein, the presently disclosed techniques approach the problem of accurately locating the body region boundaries from a machine-learning standpoint. Each of the four main body regions discussed in this paper—neck, thorax, abdomen, and pelvis—can be defined by their superior and inferior axial boundaries in the cranio-caudal direction. For an image I, these boundaries can be denoted by NS(I), NI(I), TS(I), TI(I), AS(I), AI(I), PS(I), and PI(I). The present aspects of the disclosure can be divided into two stages, training and testing, each of which can be further divided into three steps. In both the training and testing stages, the first step is the pre-processing step where each slice in a stack of axial slices is rescaled to 224×224 pixels and is combined with its neighboring slices to create compound 5-channel images. This provides additional visual context to the model. The training stage has two more steps: training a deep CNN and training a recurrent neural network (RNN). The two networks work in a cascading manner with the RNN improving upon the predictions of the CNN for the body-region boundaries which generally have high error rates. The RNN is trained on sequences of features extracted from an intermediate layer of the CNN, with the sequences defined by windows around the predictions from the CNN. Both the pre-processing step creating the 5-channel images and the RNN exploit the inherently sequential nature of the axial stack of slices. In the testing stage, the first step is the same pre-processing step as in the training stage, and the other two steps are: drawing inference from the CNN and improving the performances of the classes known to have high error rates using the RNN. The results are described and discussed herein.

Materials and Methods

Data Sets and Notations

PET/CT scans were used from 442 patients obtained from the database of the Hospital of the University of Pennsylvania. Approval for data usage was obtained from the Institutional Review Board at the Hospital of the University of Pennsylvania along with a Health Insurance Portability and Accountability Act waiver. Subjects include near-normal cases and patients with different types of disease conditions where all scans were obtained for clinical reasons only. Of the 442 scans, 262 were from head to pelvis, 39 from head to toe, and 17 from neck to toe. The mean voxel size for the low-dose CT images was $1.13 \times 1.13 \times 4.06$ mm$^3$ and the slice spacing varied from 2 mm to 5 mm: 1 image with slice spacing of 2 mm, 2 images with slice spacing of 3 mm, 8 images with slice spacing of 3.27 mm, 395 images with slice spacing of 4 mm, and 36 images with slice spacing of 5 mm. Apart from these 442 scans, diagnostic CT scans of the head and neck regions were obtained for 213 patients for testing purposes. The mean voxel size for the diagnostic CT images was $1.10 \times 1.10 \times 2.06$ mm$^3$ and the slice spacing varied from 1 mm to 3 mm: 1 image with slice spacing of 1 mm, 26 images with slice spacing of 1.5 mm, 157 images with slice spacing of 2 mm, 3 images with slice spacing of 2.5 mm, and 26 images with slice spacing of 3 mm.

For an image/in the dataset, the true superior and inferior boundaries of the neck, thorax, abdomen, and pelvis, were denoted respectively, as $NS(I)$, $NI(I)$, $TS(I)$, $TI(I)$, $AS(I)$, $AI(I)$, $PS(I)$, and $PI(I)$. For each volumetric image, $NS(I)$, $NI(I)$, $TS(I)$, $TI(I)$, $AS(I)$, $AI(I)$, $PS(I)$, and $PI(I)$ were labeled manually under the guidance of a radiologist.

Definition of Body Regions

The important point to note here is that some defining features have a high contrast with respect to their surrounding voxels (e.g., the apex of the lung for $TS(I)$ appears as two, or in some cases one, dark circular objects in the axial slice, with the slice immediately superior to this slice not having the dark circular objects, and the slice immediately inferior having two slightly larger dark circular objects), while some defining features are very subtle and exhibit very low contrast with respect to their surrounding voxels (e.g., the bifurcation of the abdominal aorta into the common iliac arteries as the distinguishing feature for $AI(I)$). This is an important observation which serves as motivation for having a two-step prediction process to improve only some of the predictions from the first step in the second step of our approach.

Figure 1B:
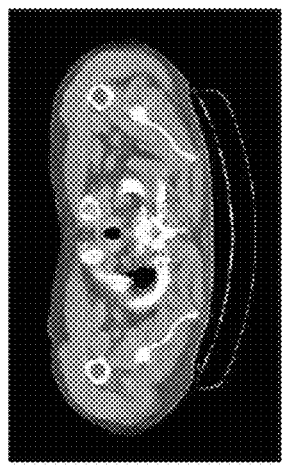
Figure 1C:
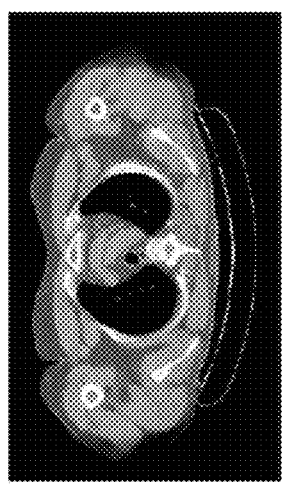
Figure 1D:
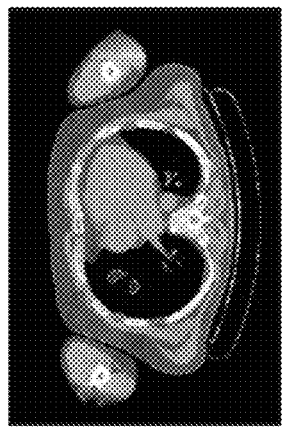
Figure 1E:
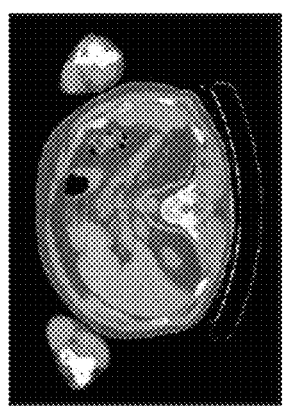
Figure 1F:
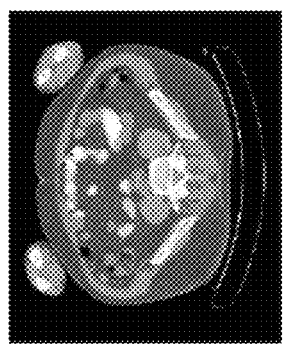
Figure 1G:
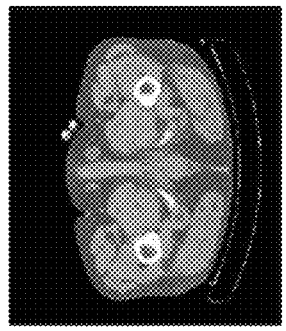

In FIGS. 1A-1G, distinguishing features for each body region boundary are marked in green. Please note that not all of these slices correspond to boundaries. FIG. 1A: A slice showing the superior-most aspect of the mandible. FIG. 1B: A slice showing the apex of the lung; the $TS(I)$ slice exists 15 mm above this slice. FIG. 1C: A slice showing the level of bifurcation of the superior vena cava into left and right brachiocephalic veins. FIG. 1D: A slice showing the superior-most aspect of the liver. FIG. 1E: A slice showing the base of the lungs; the $TI(I)$ slice is located 5 mm below this slice. FIG. 1F: A slice showing the level of bifurcation of the abdominal aorta into common iliac arteries. FIG. 1G: A slice showing the inferior-most aspect of the ischial tuberosities of the pelvis.

It is also important to note that there is often some degree of digital ambiguity present in the process of manual labelling of the ground truth for this study, arising largely due to the discrete nature of the axial stack, unlike the continuous nature of the human anatomy. For example, in the case of $AI(I)$, the slice where abdominal aorta bifurcates into the

TABLE 1

Definition of body regions and their boundary locations.

| Body region | Boundaries | Description | Definition |
| --- | --- | --- | --- |
| Neck | NS | Neck superior axial boundary location. | Superior-most aspect of the mandible. |
|  | NI | Neck inferior axial boundary location. | Level of bifurcation of the superior vena cava into left and right brachiocephalic veins. |
| Thorax | TS | Thoracic superior axial boundary location. | 15 mm superior to the apex of the lungs. |
|  | TI | Thoracic inferior axial boundary location. | 5 mm inferior to the base of the lungs. |
| Abdomen | AS | Abdominal superior axial boundary location. | Superior-most aspect of the liver. |
|  | AI | Abdominal inferior axial boundary location. | Level of bifurcation of the abdominal aorta into common iliac arteries. |
| Pelvis | PS | Pelvic superior axial boundary location. | Inferior boundary of the abdominal region. |
|  | PI | Pelvic inferior axial boundary location. | Inferior-most aspect of the ischial tuberosities. |

The body region definitions described in previous work [4,5] were used. The following four body regions were identified: neck, thorax, abdomen, and pelvis, defining each body region by two transaxial slices: the slice representing the superior boundary and the slice representing the inferior boundary. The definitions of these body region boundaries are tabulated in Table 1, and the distinguishing features for each body region boundary are shown in FIGS. 1A-1G. As mentioned earlier, the definitions of $AI(I)$ and $PS(I)$ are the same.

common iliac arteries can be marked differently by different experts, albeit within 1-2 slices of each other. This observation is important to keep in mind when looking at the results of this study.

Pre-Processing

Each volumetric image is separated into its constituent slices. Each slice is down-sampled from $512 \times 512$ to $224 \times 224$ pixels. For each slice, a 5-channel compound image is created with the slice in question as the 3rd channel. The 1st and 2nd channels are the 2 slices immediately inferior to the slice in question, and the 4th and 5th channels are the 2 slices immediately superior to the slice in question. This is done to provide the neural network with additional visual context which is crucial to the classification task. This aids in accurately classifying body region boundaries by exploiting the contrast among the channels due to the nature of the definition of the boundaries. For example, for locating the apex of the lung, the axial slice immediately superior to the slice with the apex of the lung will not contain any dark circular objects (i.e., lungs) while the axial slice immediately inferior to the slice with the apex of the lung will contain slightly larger dark circular objects (i.e., lungs); in the case of locating the slice with the inferior-most aspect of the ischial tuberosities of the pelvis, the slice immediately inferior to this slice will not contain any bright bony objects of the pelvis while the slice immediately superior will have a larger representation of the bright ischial tuberosities of the pelvis than the slice with the inferior-most aspect.

Each 5-channel image is then zero center normalized by subtracting the entire dataset's mean image from the 5-channel images. Thus, each slice is now represented by a 5-channel image. For cases where two slices are not available either before or after the slice, zero padding is used.

Convolutional Neural Networks

Convolutional neural networks (CNNs) [6] employ convolution operations on the input with weights and introduce non-linearity. They are suited for processing spatial information through the spatial arrangement of convolution operations, local connectivity, parameter sharing, and pooling operations. CNNs have shown great promise in processing spatial data, especially in tasks like image classification and image segmentation.

For the task of classification, many network architectures have been proposed and tested in literature. A few most prominent ones include VGG-167, AlexNet, and GoogLeNet [8]. Various embodiments discussed herein have been applied using the GoogLeNet architecture owing to its efficiency, both in terms of number of operations needed for a single-inference and the disk space required for the storage of the parameters. The GoogLeNet architecture is modified to accept 5-channel images as input and classify the input image into one of the nine categories. An example of the GoogLeNet architecture is shown in FIG. 2, where each "Inception Block" is a network of layers shown in FIG. 3.

Figure 2:
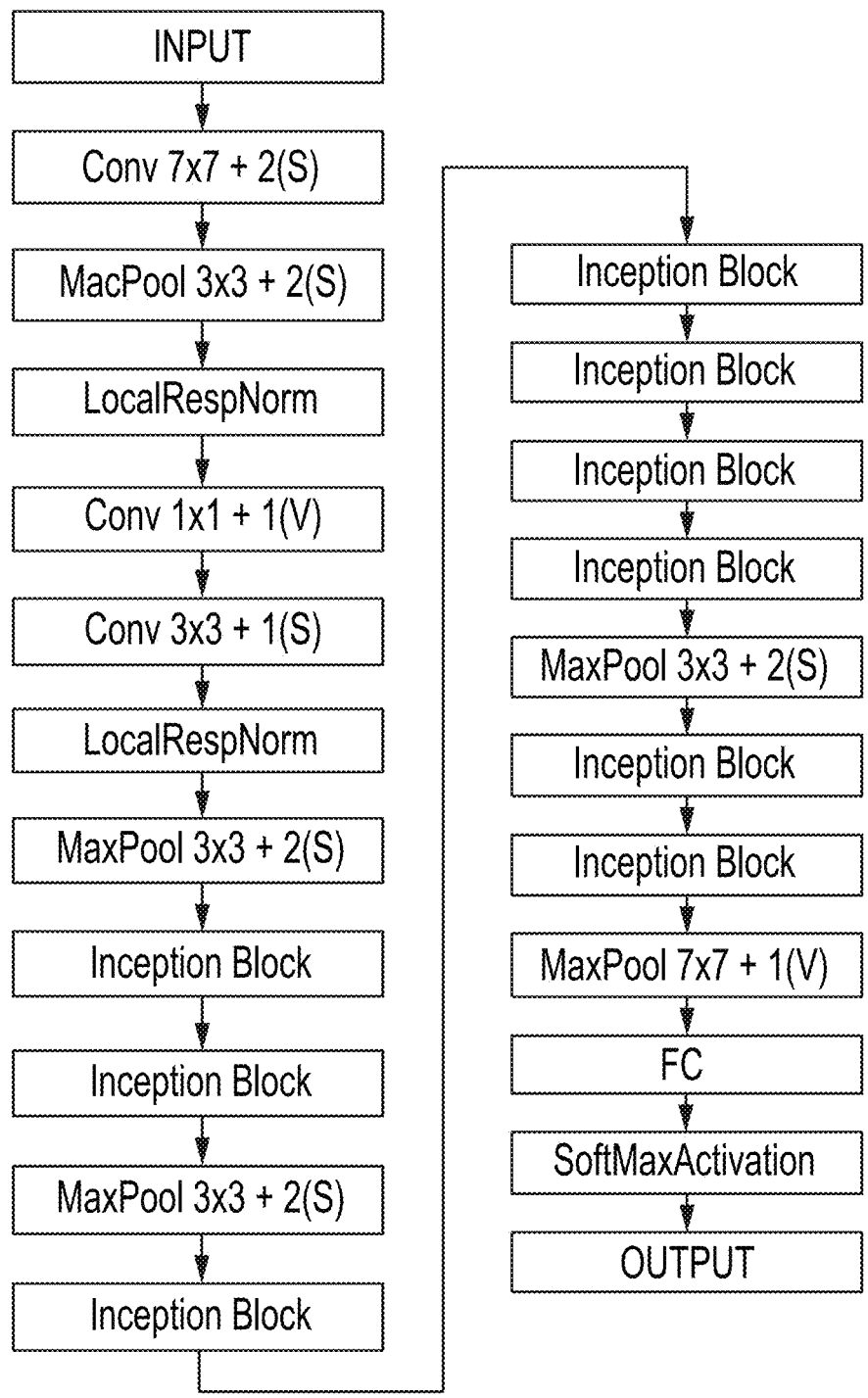
FIG. 2 illustrates a flow chart of the GoogLeNet architecture, in accordance with embodiments discussed herein.

In FIG. 2, following an Input is a series of layers, which can contain various parameters. Transformations can occur throughout various layers and/or apply specific functions. Examples of layer types can include, but are not limited to CONY, RELU, POOL, and fully connected (FC) layers. In the GoogLeNet architecture illustrated in FIG. 2, the Input is passed through Cony 7×7+2(S), MacPool 3×3+2(S), LocalRespNorm, Cony 1×1+1(V), Cony 3×3+1(S), LocalRespNorm, MaxPool 3×3+2(S), Inception Block, MaxPool 3×3+2(S), Inception Block, Inception Block, Inception Block, Inception Block, Inception Block, MaxPool 3×3+_2(S), Inception Block, Inception Block, MaxPool 7×7+1(V), FC, SoftMaxActivation, and Output.

Figure 3:
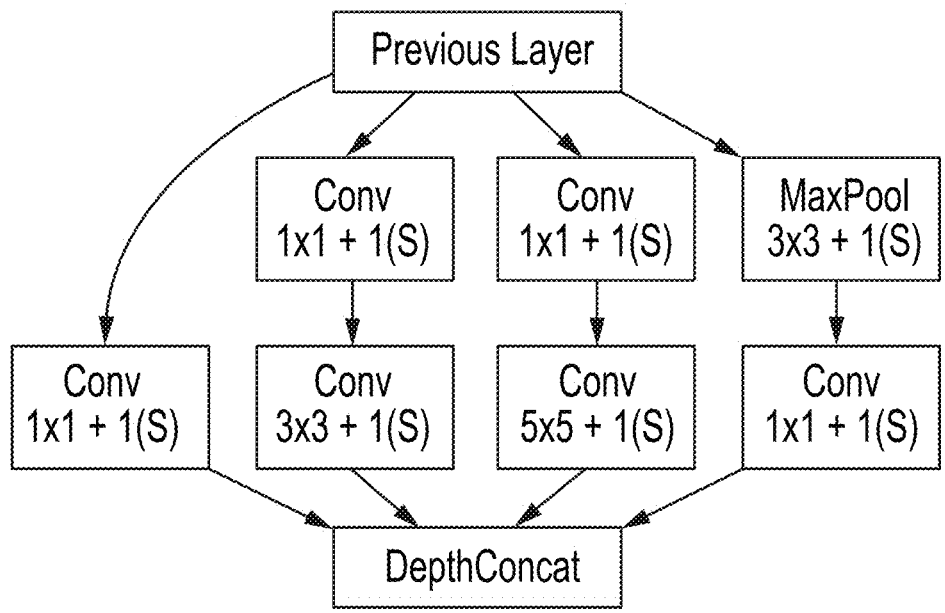
FIG. 3 illustrates an inception block with dimension reductions, in accordance with embodiments discussed herein.

FIG. 3 illustrates a network of layers in an "Inception Block" with dimension reductions. In FIG. 3, a previous layer can be passed through at least one of three Cony 1×2+1(S) layers and a MaxPool 3×3+1(5). The Cony 1×1+ 1(5) can go to DepthConcat, Cony 3×3+1(5), or Cony 5×5+1(5). Output from MaxPool 3×3+1(S) passes through Cony 1×1+1(5) to DepthConcat.

Training the Convolutional Neural Network

The dataset containing 442 volumetric images is partitioned into the training+validation dataset containing 70% of the images and the testing dataset containing 30% of the images. For each volumetric image, all the slices below the PI(I) slice are labeled as legs. All slices that do not belong to the either of the 7 body region boundary classes or the legs class are termed none-of-the-above (NOTA). The legs class is defined in order to reduce the variance in the NOTA class. From the training+validation dataset, the 7 body region boundary images are over-sampled to twice the number of samples in each class, and the legs and NOTA classes are heavily under-sampled to create a relatively balanced data-set. As the data-set is small and over-sampling is employed, data augmentation was performed on the training+validation dataset. Each image is:

Randomly horizontally flipped with a probability of 50%.

Rotated by x degrees where x is a random number between −15 to 15.

Translated along the horizontal axis by y pixels where y is a random integer between −15 and 15.

Translated along the vertical axis by z pixels where z is a random integer between −15 and 15.

The training dataset was resampled every 10 epochs to have a healthy representation of the legs and NOTA classes, and to re-augment the dataset for more effective training.

For inference on a given volumetric image, each slice is fed to the neural network along with two slices immediately superior to it, and two slices immediately inferior to it as a 5-channel image. For each 5-channel image, the probabilities for the image being one of the body region boundaries, legs or NOTA is obtained. Predictions have been iterated for all images, and the most-probable slice for each of the 7 body region boundaries is selected and marked as the predicted truth. This is subject to hard-coded rules taking into consideration the relation between the various body region boundaries. For example, if the prediction, for example, the slice number, for TS(I) is higher than the prediction of either the body region boundaries for neck, then that prediction is ignored and the slice with the second highest probability is marked as the prediction, again subject to the hard-coded rules.

Improving Training for the Convolutional Neural Network

During inference for any volumetric image, multiple slices in that image can have high probabilities for any body region boundary. These are the slices that are in the vicinity, both superior and inferior, of the ground truth for the said body region boundary. In order to (a) localize these high-probability predictions and (b) take into account marginal labelling errors (e.g., to the order of 1 slice), the trained network is retrained with a subset of the entire training dataset. This subset contains only the slices which are in the vicinity of the ground truth for each body region boundary label. For each body region boundary label, 5 images on either side, inferior and superior, are considered, resulting in 11 images per body region boundary label. Of these 10 neighboring images, with each image being a 5-channel compound image, consisting of 5 axial slices, the 2 images immediately adjacent to the ground truth, 1 superior and 1 inferior, are also marked as the ground truth for that label, effectively extending the ground truth for each body region boundary label to 3 slices.

The training was performed on a computer with i7-5930K CPU clocked at 3.50 GHz, 16 GB of RAM and a NVIDIA Titan Xp GPU with 12 GB of memory.

Recurrent Neural Networks

In order to exploit the inherently sequential nature of a stack of axial slices, recurrent neural networks (RNNs) were employed on the features extracted from the CNN. RNNs are types of artificial neural networks which are used to process sequential information. These types of networks have connections between their nodes to form a sequence of connected neural networks. RNNs have proved to work exceedingly well in processing temporal data like audio and video data 10.

If an axial stack is compared to a video, and each individual slice in the axial stack is compared to a frame in a video, an RNN seems like a natural choice of architecture for its processing. Architectures can comprise bi-directional Long Short Term Memory (LSTM) of 11 cells, dropout layers, and fully connected layers for our task. Thus, a two-step process can be implemented to solve the problem. The CNN model gives the predictions for each body region boundary, and the RNN model can be applied to improve upon the predictions that are not very accurate.

The input for the RNN is the 1024-dimensional feature vector from the last max pooling layer of the GoogLeNet architecture. The RNN model is used to improve the predictions for the classes which did not perform well, i.e., for those which had relatively larger errors in the predictions from the CNN. The RNN model is trained separately for each of the classes that did not perform well.

Figure 4:
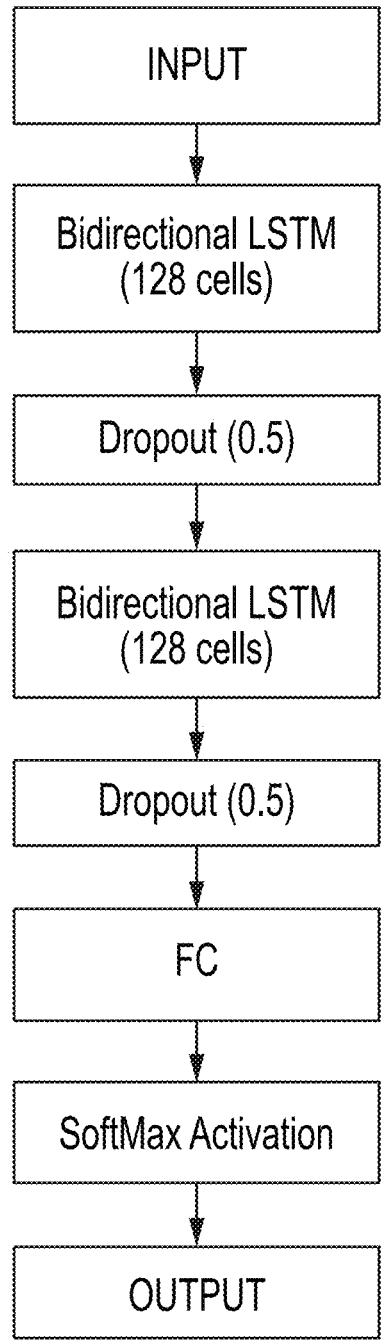
FIG. 4 illustrates an example recurrent neural network architecture, in accordance with embodiments discussed herein.

An example of the network architecture of the recurrent neural network is shown in FIG. 4. Input passes through Bidirectional LSTM (128 cells), Dropout(0.5), Bidirectional LSTM (128 cells), Dropout (0.5), FC, SoftMax Activation, and Output.

Data and Labels for RNN

For each class that did not perform well, a window of 31 slices is defined about the ground truth label in each axial stack. In each window, all slices before the ground truth label are labeled 0 and all other slices are labeled 1. Then, to simulate the error produced by the CNN, each window is offset by a random number generated using a normal distribution with the mean and standard deviation equal to the mean and standard deviation, respectively, of the errors for each of the underperforming classes from the CNN predictions. At the end, for each axial stack, a 31×1024-dimensional vector is obtained, which can be treated as a sequence of length 31.

At inference time, a sequence of length 31 consisting of 0s and 1s is predicted, and the element where the sequence changes from 0 to 1 is marked as the predicted value.

The training was performed on a computer with i7-5930K CPU clocked at 3.50 GHz, 16 GB of RAM and a NVIDIA Titan Xp GPU with 12 GB of memory.

Results and Discussion

Figure 5A:
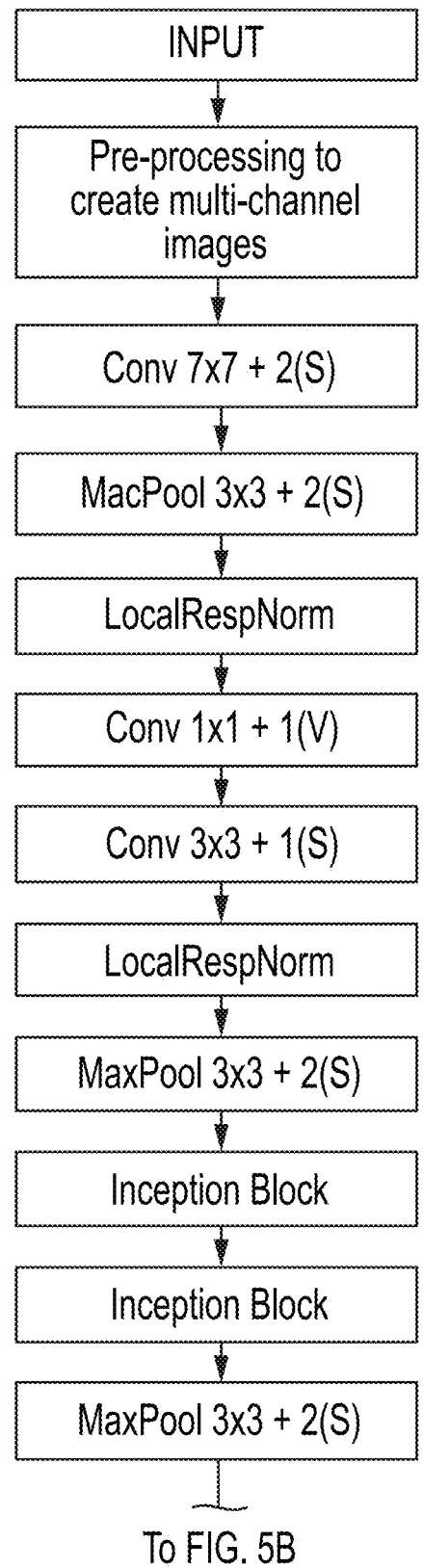
FIGS. 5A-5C illustrate an BRR-Net network architecture, in accordance with embodiments discussed herein.
Figure 5B:
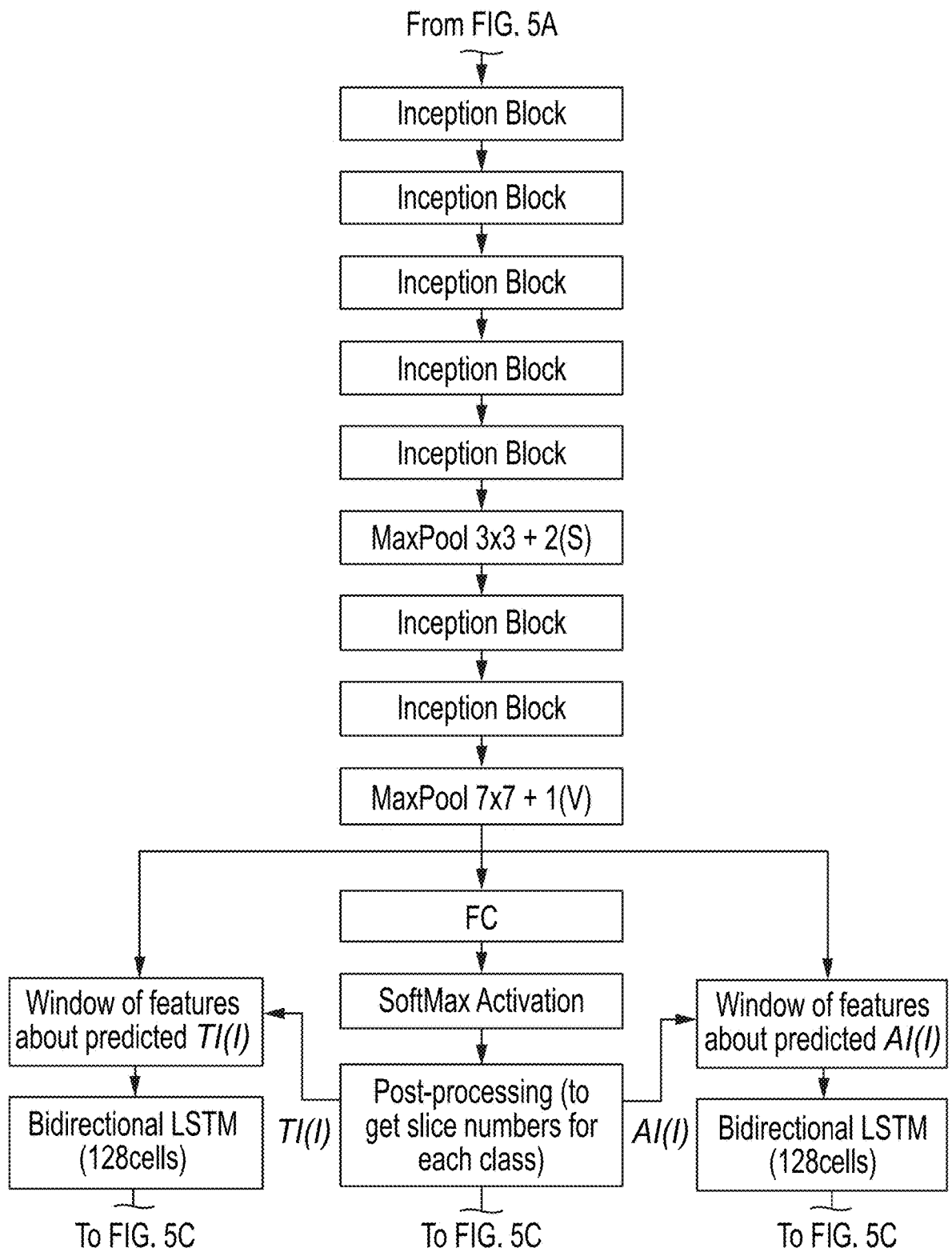
Figure 5C:
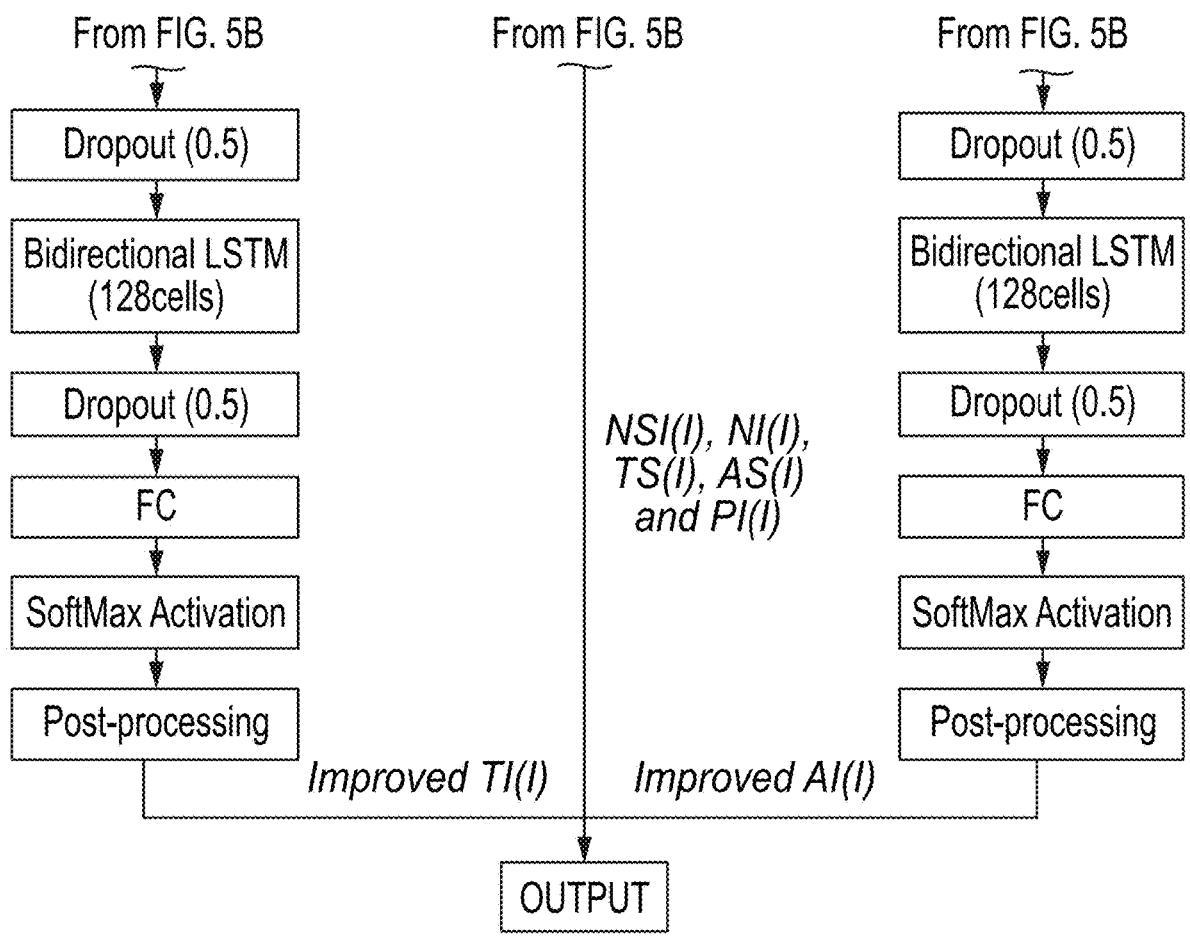

The final model BRR-Net and the architecture are shown in FIGS. 5A-5C, which figures illustrate an BRR-Net network architecture, in accordance with embodiments discussed herein.

At the time of inference, each slice in the given axial stack is scaled to 224×224 pixels and is converted into a compound 5-channel image. Each image is then sequentially fed into the CNN as the input image, and the probability of that image belonging to one of the body region boundary classes is obtained. The image with the highest probability for each class is marked as the predicted slice. For classes that are known to underperform with the CNN, the predicted slice is fed into the RNN by creating sequence of feature vectors about that slice, each vector having been obtained from an intermediate layer of the CNN, and the refined prediction is obtained. Thus, the final output for a given axial stack of slices is obtained as the slice numbers corresponding to each of the classes.

Before examining the results presented henceforth, it is important to examine the variations in human performance in the task of labelling the body region boundaries. In a previous work [1], the TS(I), TI(I), AS(I), AI(I), and PI(I) classes were labeled for 180 volumetric images by an expert. For this study, the images were labeled again, by a different expert. The mean and standard deviations for the absolute difference in the number of slices in the labels by the two experts are tabulated in Table 2.

TABLE 2

Mean and standard deviation (SD) of absolute difference (number of slices) in the labels by two different experts.

| | TS | TI | AS | AI | PI |
|---|---|---|---|---|---|
| Mean | 0.141 | 0.352 | 0.141 | 4.125 | 0.740 |
| SD | 0.663 | 0.998 | 0.423 | 5.342 | 0.640 |

It is quite clear that there is significant variation in labels for the class AI(I), largely due to the nature of the defining feature of the AI(I) class.

The results from the CNN are tabulated in Table 3 and Table 4. In Table 3, each cell represents the fraction of total number of cases that were within (less than or equal to) the absolute error mentioned in the first column. Table 4 shows the mean and standard deviation of the predictions from the ground truth.

As is evident, the model performs well except for classes AI(I) and TI(I). This is predominantly due to the nature of the defining features of these two classes. For the case of AI(I) the defining feature, the level of bifurcation of the superior vena cava into the left and right brachiocephalic veins, is sometimes difficult to locate accurately. For the case of TI(I), the defining feature, the base of the lungs appears as a mere sliver of black in many cases making it difficult to observe in some cases.

TABLE 3

Results after training the modified GoogLeNet on all classes.

| Abs. Err. | NS | NI | TS | TI | AS | AI | PI |
|---|---|---|---|---|---|---|---|
| 1 | 0.951 | 0.810 | 1 | 0.534 | 0.962 | 0.308 | 1 |
| 2 | 1 | 0.933 | 1 | 0.790 | 0.977 | 0.481 | 1 |
| 3 | 1 | 0.952 | 1 | 0.850 | 0.985 | 0.617 | 1 |
| 4 | 1 | 0.971 | 1 | 0.917 | 0.985 | 0.744 | 1 |
| 5 | 1 | 0.990 | 1 | 0.947 | 0.985 | 0.805 | 1 |

TABLE 4

Mean error and standard deviation (SD) from the ground truth (number of slices) in the prediction of the classes.

| | NS | NI | TS | TI | AS | AI | PI |
|---|---|---|---|---|---|---|---|
| Mean | 0.610 | 1.050 | 0.308 | 1.848 | 0.571 | 3.424 | 0.504 |
| SD | 0.584 | 1.132 | 0.464 | 1.959 | 2.441 | 3.162 | 0.502 |

As explained herein, the RNN model is employed only for those classes which have relatively higher errors. AI(I) and TI(I) are empirically chosen on the basis of Table 3 and Table 4 to employ the RNN. The RNN was trained on classes AI(I) and TI(I), and the results from the CNN, followed by the RNN for classes AI(I) and TI(I) are tabulated in Table 5 and Table 6. In Table 5, each cell represents the fraction of total number of cases that were within the absolute error mentioned in the first column. Table 6 shows the mean and standard deviation of the predictions from the ground truth. Significant improvements can be seen for both AI(I) and TI(I) classes, which have benefitted from the sequential processing of their neighboring slices.

TABLE 5

Results after training the CNN on all classes followed by RNN for AI(I) and TI(I).

| Abs. Err. | NS | NI | TS | TI | AS | AI | PI |
|---|---|---|---|---|---|---|---|
| 1 | 0.951 | 0.810 | 1 | 0.534 | 0.962 | 0.308 | 1 |
| 2 | 1 | 0.933 | 1 | 0.790 | 0.977 | 0.481 | 1 |
| 3 | 1 | 0.952 | 1 | 0.850 | 0.985 | 0.617 | 1 |
| 4 | 1 | 0.971 | 1 | 0.917 | 0.985 | 0.744 | 1 |
| 5 | 1 | 0.990 | 1 | 0.947 | 0.985 | 0.805 | 1 |

TABLE 6

Mean error and standard deviation (SD) from the ground truth (number of slices) in the prediction of the classes.

| | NS | NI | TS | TI | AS | AI | PI |
|---|---|---|---|---|---|---|---|
| Mean | 0.610 | 1.050 | 0.308 | 1.353 | 0.571 | 2.827 | 0.504 |
| SD | 0.584 | 1.132 | 0.464 | 1.709 | 2.441 | 2.746 | 0.502 |

The results are significantly better than those in our previous work, which when trained and tested for 5 classes, AS(I), AI(I), TS(I), TI(I), and PI(I), had mean absolute errors equal to 3.3, 5.0, 2.6, 5.4, and 3.1 respectively.

Figure 6:
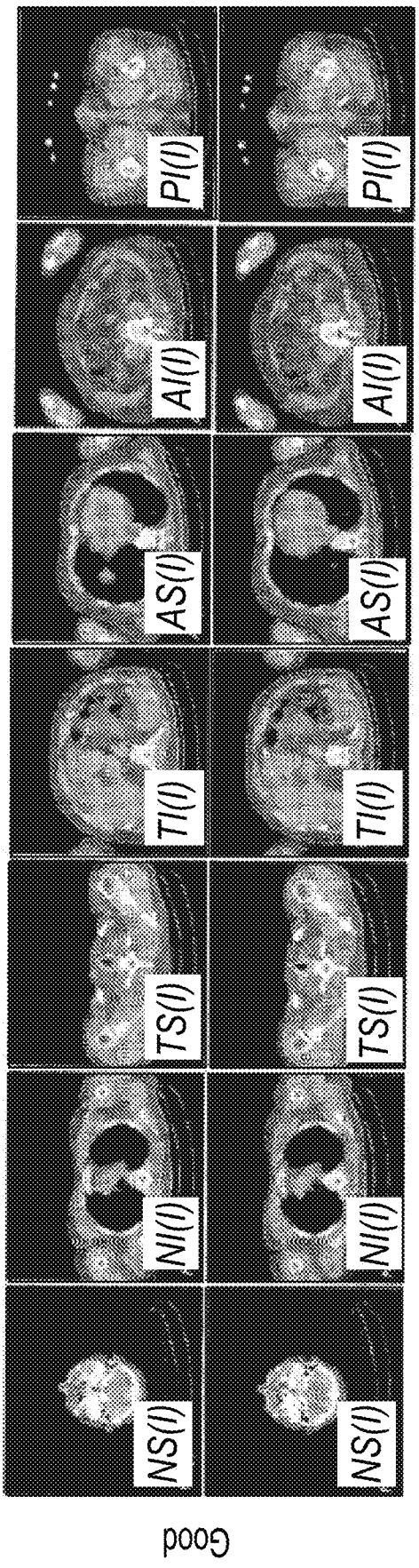
FIG. 6 illustrates sample true and predicted slices for a good case for each class (e.g., the first two rows; nS<=1) and a poor case for each class (e.g., the bottom two rows; nS>1) for low-dose CT images.
Figure 6:

Samples of results, both good (within one slice of the ground truth) and poor (more than one slice from the ground truth) are shown in FIG. 6. Poor examples for classes TS(I) and PI(I) were not available as the error was within 1 slice for all test cases for these classes.

Even though our models were trained on low-dose unenhanced CT images, tests were carried out to see if they can be used on diagnostic contrast-enhanced CT images as well. As described herein, 213 diagnostic contrast-enhanced CT images of the neck region with an average voxel size of 1.10×1.10×2.06 mm3 were obtained and labeled for 3 classes: NS(I), NI(I), and TS(I). The results from the final two-step model are tabulated in Table 7 and Table 8. Samples of results for diagnostic contrast-enhanced CT images are shown in FIG. 7.

FIG. 6 illustrates sample true and predicted slices for a good case for each class (first two rows; nS<=1) and a poor case for each class (bottom two rows; nS>1) for low-dose unenhanced CT images.

Figure 7:
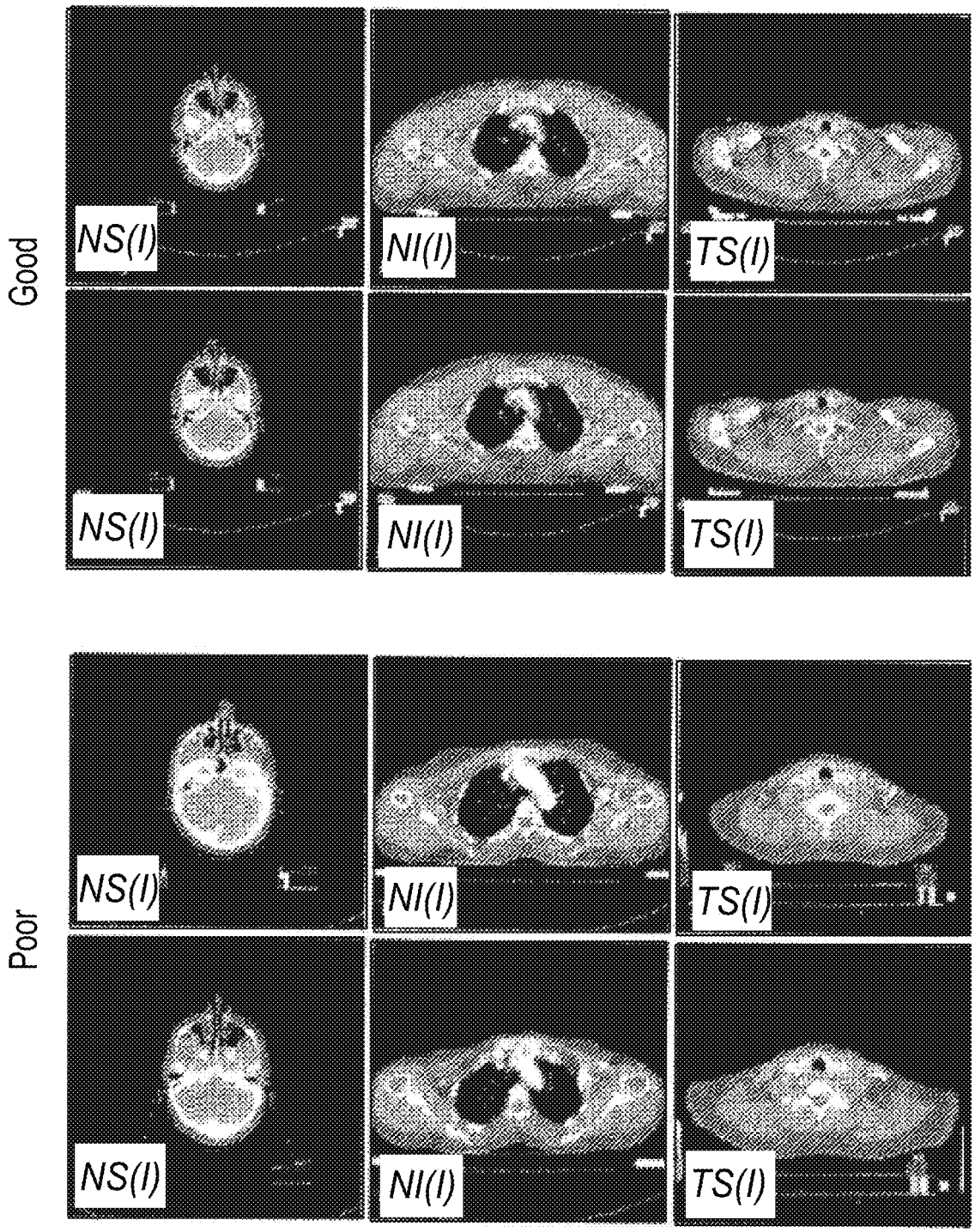
FIG. 7 illustrates sample true and predicted slices for a good case for each class (e.g., the first two rows; nS<=1) and a poor case for each class (e.g., the bottom two rows; nS>1) for diagnostic CT images.

FIG. 7 illustrates sample true and predicted slices for a good case for each class (e.g., first two rows; nS<=1) and a poor case for each class (e.g., bottom two rows; nS>1) for diagnostic contrast-enhanced CT images.

It is interesting to note here that even though the performance seems worse than that on the low-dose CT images, the mean inter-slice separation in the diagnostic contrast-enhanced CT images is almost half of that of low-dose unenhanced CT images, meaning that even though the error is higher in number of absolute slices, it is quite comparable to the performance on low-dose unenhanced CT images in absolute distance from the ground truth.

TABLE 7

Results from the final model on diagnostic contrast-enhanced CT images.

| Abs. Err. | NS | NI | TS |
|---|---|---|---|
| 1 | 0.606 | 0.359 | 0.934 |
| 2 | 0.831 | 0.574 | 0.977 |
| 3 | 0.930 | 0.737 | 0.995 |
| 4 | 0.962 | 0.818 | 1 |
| 5 | 0.991 | 0.900 | 1 |
| 6 | 0.995 | 0.938 | 1 |
| 7 | 0.995 | 0.976 | 1 |
| 8 | 0.995 | 0.990 | 1 |
| 9 | 1 | 0.995 | 1 |
| 10 | 1 | 1 | 1 |

Automatically localizing body regions in medical images by locating their superior and inferior axial boundaries is an important step towards the acceptance and subsequent application of standardized body region definitions. It is also increasingly important in developing applications based on this ideology, especially the systems designed for anatomical regions which depend on the precise boundaries. Embodiments discussed herein describe a novel technique to automatically locate the axial body region boundaries of four body regions—neck, thorax, abdomen, and pelvis—within 1 slice for a majority of the definitions, and within at most 3 slices overall. If additional body regions are defined or if existing body region definitions are modified in the future, this model can be retrained to learn the representations of their defining features. The models trained on low-dose unenhanced CT images also work remarkably well on diagnostic contrast-enhanced CT images. Due to the nature of the algorithm, this approach can be generalized to other imaging modalities in addition to its demonstrated performance on low-dose CT and diagnostic CT images.

In addition, such modules and techniques can be incorporated into front-end and/or back-end modules to assist in various medical applications, such as body tissue composition analysis. It will be appreciated that aspects of the present disclosure can be applied to various temporal events, video analysis, image sequences, and the like. Moreover, since body region definition is crucial for meaningful and standardized means of quantifying major bodily tissues, such as muscle subcutaneous adipose tissue, visceral adipose tissue, and bone tissue in different body regions, aspects of the present disclosure is applicable to a range of imaging uses and applications.

Aspects

The following Aspects are illustrative only and do not serve to limit the scope of the present disclosure or the appended claims.

Aspect 1. A method to localize body regions in medical images, comprising: receiving, at a computing device, a plurality of images representing axial slices of a patient; determining, by applying a convolutional neural network (CNN) to each of the plurality of images, data indicating one or more body regions comprising at least one internal organ; and refining the one or more body regions by applying a recurrent neural network (RNN) to the plurality of images, wherein the RNN is trained to identify the one or more extracted features of the body region.

Aspect 2. The method of Aspect 1, wherein the plurality of images comprise at least one of: CT scans, PET scans, SPECT scans, MRI scans, and scans from a medical imaging device.

Aspect 3. The method of any one of Aspects 1-2, wherein the one or more body regions comprise at least one of: a head region, a neck region, a thorax, an abdomen, and a pelvis.

Aspect 4. The method of any one of Aspects 1 to 3, further comprising classifying each image, by the CNN, as representing: an inferior boundary of a body region, a superior boundary of a body region, or neither.

Aspect 5. The method of Aspect 4, further comprising refining at least one of the inferior boundary and the superior boundary based on standardized definitions for the identified body region.

Aspect 6. The method of any one of Aspects 1-5, wherein one or both of the CNN and RNN analyze the plurality of images based on a contrast comparison between a sequence of images.

Aspect 7. The method of any one of Aspects 1-6, further comprising determining a subset of the plurality of images comprising axial slices within the boundaries of the body region.

Aspect 8. A system to localize body regions in medical images, comprising: an imaging device capturing a plurality of images representing axial slices of a patient; at least one computing device comprising a processor and at least one memory storing instructions that when executed by the processor, causes the computing device to: receive the plurality of images from the imaging device; determining, by applying a convolutional neural network (CNN) to each of the plurality of images, data indicating one or more body regions comprising at least one internal organ; and refine the one or more body regions by applying a recurrent neural network (RNN) to the plurality of images, wherein the RNN is trained to identify the one or more extracted features of the body region.

Aspect 9. The system of Aspect 8, wherein the plurality of images comprise at least one of: CT scans, PET scans, SPECT, scans, MRI scans, and scans from a medical imaging device.

Aspect 10. The system of any one of Aspects 1 to 9, wherein the one or more body regions comprise at least one of: a head region, a neck region, a thorax, an abdomen, and a pelvis.

Aspect 11. The system of any one of Aspects 1 to 10, wherein determining data indicating one or more body regions comprises classifying each image as representing: an inferior boundary of a body region, a superior boundary of a body region, or neither.

Aspect 12. The system of Aspect 11, wherein the inferior boundary and the superior boundary are refined using standardized definitions for the identified body region.

Aspect 13. The system of any one of Aspects 1 to 12, wherein one or both of the CNN and RNN analyze the medical images based on a contrast comparison between a sequence of images.

Aspect 14. The system of any one of Aspects 1 to 13, wherein at least one of the CNN and RNN apply a multi-channel approach utilizing an ordered sequence of medical images to predict body region boundaries.

Aspect 15. The system of Aspect 14, wherein at least one of the CNN and RNN increase inter-slice contrast to improve predicted body region boundaries.

Aspect 16. The system of any one of Aspects 11 to 15, wherein the CNN and RNN are trained using a combination of training and testing sets of medical images.

Aspect 17. The system of Aspect 16, wherein at least one of the training and testing sets comprise standardized body region definitions.

Aspect 18. The system of any one of Aspects 11 to 17, further comprising determining a subset of the plurality of images comprising axial slices within the boundaries of the body region; and outputting the subset of the plurality of images on a display.

Aspect 19. A device to localize body regions in medical images, comprising: at least one processor; and a memory comprising instructions that, when executed on the processor, cause the device to: receive, at a computing device, a plurality of images representing axial slices of a patient; determine, by applying a convolutional neural network (CNN) to each of the plurality of images, data indicating one or more body regions comprising at least one internal organ; and refine the one or more body regions by applying a recurrent neural network (RNN) to the plurality of images, wherein the RNN is trained to identify the one or more extracted features of the body region.

Aspect 20. The device of Aspect 19, wherein the plurality of images comprises at least one of: CT scans, PET scans, SPECT scans, MRI scans, and scans from a medical imaging device.

Aspect 21. The device of any one of Aspects 19-20, wherein the one or more body regions comprise at least one of: a head region, a neck region, a thorax, an abdomen, and a pelvis.

Aspect 22. The device of any one of Aspects 19-21, wherein the memory further comprises instructions that cause the processor to: classify each image, by the CNN, as representing: an inferior boundary of a body region, a superior boundary of a body region, or neither.

Aspect 23. The device of Aspects 22, wherein the memory further comprises instructions that cause the processor to: classify at least one of the inferior boundary and the superior boundary based on standardized definitions for the identified body region.

Aspect 24. The device of any one of Aspects 19-23, wherein one or both of the CNN and RNN analyze the plurality of images based on a contrast comparison between a sequence of images.

Aspect 25. The device of any one of Aspects 19-24, wherein the memory further comprises instructions that cause the processor to: determine a subset of the plurality of images comprising axial slices within the boundaries of the body region; and output the subset of the plurality of images on a display.

Aspect 26. A non-transitory computer-readable medium storing instructions that, when executed by one or more processors, cause a device to perform the methods of any one of Aspects 1-7.

Aspect 27. A device comprising: one or more processors; and a memory storing instructions that, when executed by the one or more processors, cause the device to perform the methods of any one of Aspects 1-7.

REFERENCES

The following references are provided for the reader's convenience; the listing of a reference here is not necessarily an indication that a reference is material to the patentability of the disclosed technology.

1 Bai, P., Udupa, J. K., Tong, Y., Xie, S. and Torigian, D. A., 2019. Body region localization in whole-body low-dose CT images of PET/CT scans using virtual landmarks. Medical physics, 46(3), pp. 1286-1299.

2 Udupa, J. K., Odhner, D., Zhao, L., Tong, Y., Matsumoto, M. M., Ciesielski, K. C., Falcao, A. X., Vaideeswaran, P., Ciesielski, V., Saboury, B. and Mohammadianrasanani, S., 2014. Body-wide hierarchical fuzzy modeling, recognition, and delineation of anatomy in medical images. Medical image analysis, 18(5), pp. 752-771.

3 Wang, H., Udupa, J. K., Odhner, D., Tong, Y., Zhao, L. and Torigian, D. A., 2016. Automatic anatomy recognition in whole-body PET/CT images. Medical physics, 43(1), pp. 613-629.

4 Hussein, S., Green, A., Watane, A., Reiter, D., Chen, X., Papadakis, G. Z., Wood, B., Cypess, A., Osman, M. and Bagci, U., 2017. Automatic segmentation and quantification of white and brown adipose tissues from PET/CT scans. IEEE transactions on medical imaging, 36(3), pp. 734-744.

5 Bai, P., Udupa, J. K., Tong, Y., Xie, S. and Torigian, D. A., 2017, March. Automatic thoracic body region localization. In Medical Imaging 2017: Computer-Aided Diagnosis (Vol. 10134, p. 101343X). International Society for Optics and Photonics.

6 Krizhevsky, A., Sutskever, I. and Hinton, G. E., 2012. Imagenet classification with deep convolutional neural networks. In Advances in neural information processing systems (pp. 1097-1105).

7 Simonyan, K. and Zisserman, A., 2014. Very deep convolutional networks for large-scale image recognition. arXiv preprint arXiv:1409.1556.

8 Szegedy, C., Liu, W., Jia, Y., Sermanet, P., Reed, S., Anguelov, D., Erhan, D., Vanhoucke, V. and Rabinovich, A., 2015. Going deeper with convolutions. In Proceedings of the IEEE conference on computer vision and pattern recognition(pp. 1-9).

9 Canziani, A., Paszke, A. and Culurciello, E., 2016. An analysis of deep neural network models for practical applications. arXiv preprint arXiv:1605.07678.

10 Lipton, Z. C., Berkowitz, J. and Elkan, C., 2015. A critical review of recurrent neural networks for sequence learning. arXiv preprint arXiv:1506.00019.

11 Hochreiter, S. and Schmidhuber, J., 1997. Long short-term memory. Neural computation, 9(8), pp. 1735-1780.

12 Wang, Y., Qiu, Y., Thai, T., Moore, K., Liu, H. and Zheng, B., 2017. A two-step convolutional neural network based computer-aided detection scheme for automatically segmenting adipose tissue volume depicting on CT images. Computer methods and programs in biomedicine, 144, pp. 97-104.

13 Lee, C. C. and Chung, P. C., 2000. Recognizing abdominal organs in CT images using contextual neural network and fuzzy rules. In Proceedings of the 22nd Annual International Conference of the IEEE Engineering in Medicine and Biology Society (Cat. No. 00CH37143) (Vol. 3, pp. 1745-1748). IEEE.

What is claimed:

1. A method to localize body regions in medical images, comprising:
   receiving, at a computing device, an image set comprising a plurality of images representing a sequence of axial slices of a patient;
   determining, by applying a convolutional neural network (CNN) to the image set, data indicating boundaries defining one or more body regions comprising at least one internal organ, and wherein the one or more body regions correspond to a subset of images representing the sequence of axial slices; and
   refining the one or more body regions by applying a recurrent neural network (RNN) to the plurality of images, wherein the RNN is trained to identify the one or more extracted features of the body region.

2. The method of claim 1, wherein the plurality of images comprise at least one of: CT scans, PET scans, SPECT scans, MM scans, and scans from a medical imaging device.

3. The method of claim 1, wherein the one or more body regions comprise at least one of: a head region, a neck region, a thorax, an abdomen, and a pelvis.

4. The method of claim 1, further comprising classifying each image, by the CNN, as representing: an inferior boundary of a body region, a superior boundary of a body region, or neither.

5. The method of claim 4, further comprising refining at least one of the inferior boundary and the superior boundary based on standardized definitions for the identified body region.

6. The method of claim 1, wherein one or both of the CNN and RNN analyze the plurality of images based on a contrast comparison between a sequence of images.

7. The method of claim 1, further comprising determining a subset of the plurality of images comprising axial slices within the boundaries of the body region.

8. A system to localize body regions in medical images, comprising:
   an imaging device capturing a plurality of images representing axial slices of a patient;
   at least one computing device comprising a processor and at least one memory storing instructions that when executed by the processor, causes the computing device to:
      receive an image set from the imaging device, wherein the image set comprises a plurality of images representing a sequence of axial slices of a patient;
      determining, by applying a convolutional neural network (CNN) to the image set, data indicating boundaries defining one or more body regions comprising at least one internal organ, and wherein the one or more body regions correspond to a subset of images representing the sequence of axial slices; and
      refine the one or more body regions by applying a recurrent neural network (RNN) to the plurality of images, wherein the RNN is trained to identify the one or more extracted features of the body region.

9. The system of claim 8, wherein the plurality of images comprise at least one of: CT scans, PET scans, SPECT, scans, MRI scans, and scans from a medical imaging device.

10. The system of claim 8, wherein the one or more body regions comprise at least one of: a head region, a neck region, a thorax, an abdomen, and a pelvis.

11. The system of claim 8, wherein determining data indicating one or more body regions comprises classifying each image as representing: an inferior boundary of a body region, a superior boundary of a body region, or neither.

12. The system of claim 11, wherein the inferior boundary and the superior boundary are refined using standardized definitions for the identified body region.

13. The system of claim 8, wherein one or both of the CNN and RNN analyze the medical images based on a contrast comparison between a sequence of images.

14. The system of claim 8, wherein at least one of the CNN and RNN apply a multi-channel approach utilizing an ordered sequence of medical images to predict body region boundaries.

15. The system of claim 14, wherein at least one of the CNN and RNN increase inter-slice contrast to improve predicted body region boundaries.

16. The system of claim 8, wherein the CNN and RNN are trained using a combination of training and testing sets of medical images.

17. The system of claim 16, wherein at least one of the training and testing sets comprise standardized body region definitions.

18. The system of claim 8, further comprising determining a subset of the plurality of images comprising axial slices within the boundaries of the body region; and outputting the subset of the plurality of images on a display.

19. A device to localize body regions in medical images, comprising:
- at least one processor; and
- a memory comprising instructions that, when executed on the processor, cause the device to:
  - receive, at a computing device, an image set comprising a plurality of images representing a sequence of axial slices of a patient;
  - determine, by applying a convolutional neural network (CNN) to the image set, data indicating boundaries defining one or more body regions comprising at least one internal organ, and wherein the one or more body regions correspond to a subset of images representing the sequence of axial slices; and
  - refine the one or more body regions by applying a recurrent neural network (RNN) to the plurality of images, wherein the RNN is trained to identify the one or more extracted features of the body region.

20. The device of claim 19, wherein the plurality of images comprise at least one of: CT scans, PET scans, SPECT scans, MM scans, and scans from a medical imaging device.

21. The device of claim 19, wherein the one or more body regions comprise at least one of: a head region, a neck region, a thorax, an abdomen, and a pelvis.

22. The device of claim 19, wherein the memory further comprises instructions that cause the processor to: classify each image, by the CNN, as representing: an inferior boundary of a body region, a superior boundary of a body region, or neither.

23. The device of claim 22, wherein the memory further comprises instructions that cause the processor to: classify at least one of the inferior boundary and the superior boundary based on standardized definitions for the identified body region.

24. The device of claim 19, wherein one or both of the CNN and RNN analyze the plurality of images based on a contrast comparison between a sequence of images.

25. The device of claim 19, wherein the memory further comprises instructions that cause the processor to: determine a subset of the plurality of images comprising axial slices within the boundaries of the body region; and output the subset of the plurality of images on a display.

* * * * *

UNITED STATES PATENT AND TRADEMARK OFFICE
CERTIFICATE OF CORRECTION

PATENT NO. : 11,995,830 B2
APPLICATION NO. : 17/172741
DATED : May 28, 2024
INVENTOR(S) : Jayaram K. Udupa et al.

It is certified that error appears in the above-identified patent and that said Letters Patent is hereby corrected as shown below:

In the Specification

Column No. 9, Line no. 48, Replace:
"to CONY, RELU,"
With:
--to CONV, RELU,--

Column No. 9, Line no. 50, Replace:
"through Cony 7"
With:
--through Conv 7--

Column No. 9, Line no. 51, Replace:
"LocalRespNorm, Cony 1"
With:
--LocalRespNorm, Conv 1--

Column No. 9, Line no. 51, Replace:
"(V), Cony 3"
With:
--(V), Conv 3--

Column No. 9, Line no. 59, Replace:
"three Cony 1"
With:
--three Conv 1--

Column No. 9, Line no. 60, Replace:
"3×3+1(5). The"

Signed and Sealed this
Twenty-third Day of July, 2024

Katherine Kelly Vidal
*Director of the United States Patent and Trademark Office*

With:
--3×3+1(S). The--

Column No. 9, Line nos. 60-61, Replace:
"The Cony 1×1+1(5) can"
With:
--The Conv 1×1+1(S) can--

Column No. 9, Line no. 61, Replace:
"DepthConcat, Cony 3×3+1(5), or"
With:
--DepthConcat, Conv 3×3+1(S), or--

Column No. 9, Line nos. 61-62, Replace:
"or Cony 5×5+1(5). Output"
With:
--or Conv 5×5+1(S). Output--

Column No. 9, Line nos. 63, Replace:
"through Cony 1×1+1(5) to"
With:
--through Conv 1×1+1(S) to--

Column No. 15, Line nos. 40, Replace:
"scans, SPECT, scans, MRI"
With:
--scans, SPECT scans, MRI--

In the Claims

Column No. 18, Claim 2, Line no. 5, Replace:
"scans, MM scans,"
With:
--scans, MRI scans,--

Column No. 18, Claim 9, Line nos. 46-47, Replace:
"scans, SPECT, scans, MRI"
With:
--scans, SPECT scans, MRI--

Column No. 20, Claim 20, Line no. 3, Replace:
"scans, MM scans,"
With:
--scans, MRI scans,--